KENNETH J. FEWEL
INVENTOR

BY John Paul Robinson Jr.
ATTORNEY

United States Patent Office 3,453,938
Patented July 8, 1969

3,453,938
ACTUATOR MECHANISM
Kenneth J. Fewel, Arlington, Tex., assignor to LTV Aerospace Corporation, Dallas, Tex., a corporation of Delaware
Filed June 26, 1967, Ser. No. 648,650
Int. Cl. F15b 15/06, 13/04
U.S. Cl. 92—33    8 Claims

ABSTRACT OF THE DISCLOSURE

A reversible actuator mechanism for converting linear movement into rotary motion including an inner member having oblique threads fixedly secured to an outer surface thereof and an outer member having oblique threads fixedly secured to an inner surface thereof. The outer member is spaced from and surrounds the inner member for defining a piston chamber therebetween. An axially movable piston is disposed within the chamber and is constructed and arranged for simultaneously engaging both of the threads. And a fluid pressure control means is adapted to selectively move the piston to effect rotation of one of the members.

---

The present invention relates to improvements in actuating mechanisms for converting linear movement into rotary motion.

Fluid actuators are well known devices and are used for a wide variety of functions, such as operating valves, positioning control surfaces of aircraft and missiles, opening and closing furnace dampers, steering vehicles, and other, similar operations. A serious disadvantage of many of these prior art actuators is they include complex and expensive mechanisms, the majority of which are too heavy and cumbersome to be satisfactorily employed on aircraft, boats or other types of vehicles. When many of these prior art units are utilized for steering the caster-type third wheel of an aircraft tricycle landing carriage, an external-torque steering linkage system is required to interconnect the externally mounted actuator mechanism to the member which is moved thereby. The principal defect of such a system is that, at the extremes of the steering range, the actuator output torque is generally decreased severely from the maximum output torque of the actuator mechanism. Such inefficiency is extremely undesirable and far from meeting the desired operating requirements for most actuator mechanisms. In addition, such prior art actuators swivel the steering wheel or wheels of an aircraft only through a limited angular range, and the external-torque steering linkage is required to be manually disconnected for effecting free swiveling or angular movement of the steering wheel for towing and parking the aircraft.

An object of the present invention is to provide an actuator mechanism for converting linear movement into rotary motion, whereby a structural member is adapted to move between a plurality of positions, within a minimum period of time, after actuation of a control mechanism to set the actuator mechanism in motion.

Another object of the present invention is to provide a lightweight, unusually compact actuator mechanism that is coaxially mounted with respect to a member which is driven thereby.

A further object of this invention is to provide a coaxial, rotary actuator operatively associated with a vehicle steering mechanism wherein the actuator has spaced, threaded portions engaging a reciprocating piston member for producing rotary motion.

Other objects and adventages will be apparent from the specification and claims and from the accompanying drawing illustrative of the invention.

Figure 1:
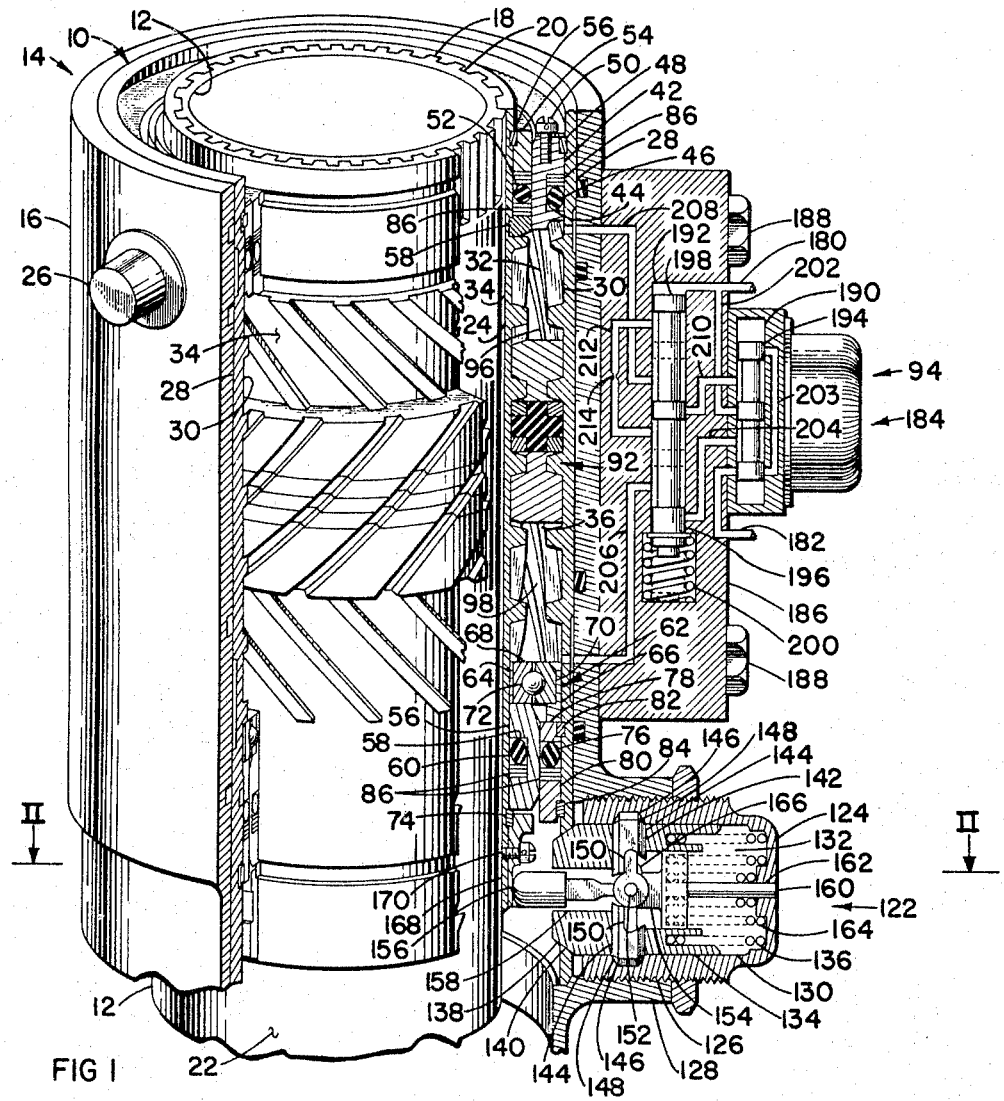
FIGURE 1 is a perspective view, partly in section, of the present actuator mechanism.

Certain terminology will be used in the following description for convenience in reference only and is not intended to be limiting. The words "upwardly," "downwardly," "rightwardly," and "leftwardly" will designate directions in the drawing to which reference is made. The words "inwardly" and "outwardly" will refer to directions toward and away from, respectively, a geometric axis of the actuator mechanism. Such terminology will include, the words specifically mentioned, derivatives thereof and words of similar import.

Referring now to FIG. 1, a fluid-actuated, coaxial, rotary actuator mechanism 10 is spaced from and substantially concentrically disposed about the outer surface of an inner tubular strut member 12 of a conventional aircraft shock strut assembly 14. The strut assembly 14 includes an outer, tubular strut member 16 concentrically disposed about the inner tubular strut member 12. The actuator mechanism 10 is secured to strut member 12 by alternate, interlocking splines 18 and 20 fixedly attached to the outer surface 22 of strut member 12 and the inner surface 24 of actuator mechanism 10, respectively. One end of strut assembly 14 is attached to an aircraft by conventional means, for example, a lug 26 mouted on strut member 16, and the opposite end is connected, as through a suitable scissors-type linkage (not shown) to a castor-type third wheel of a tricycle carriage; this conventional arrangement, however, is well known in the art and need not be illustrated or described in detail.

The actuator mechanism 10 comprises a substantially cylinder-like outer housing or member 28 which is provided with an internal cylinder-like wall or surface portion 30 for defining a cavity 32 therein. The inner surface portion 30 is spaced from and concentrically disposed about or surrounding a cylinder-like inner member 34 for defining a substantially annular chamber 36 therebetween. The chamber 36 is provided with a first fluid sealing means for effecting a fluid seal adjacent one end of chamber 36, and a second fluid sealing means is positioned adjacent the opposite end for confining a fluid therein. The first fluid sealing means includes an outer annular gland 42 which has an outwardly opening annular recess 44 that is adapted to receive a suitable seal 46 for establishing a seal between a portion of the inner surface of outer member 28 and outer gland 42. A split retaining ring 48 is received in a complementary annular groove which is disposed in member 28 and cooperates with fastener means 50 for positioning seal 46 with respect to outer member 28. A second seal 52 is radially positioned between outer annular gland 42 and a portion of the outer surface of inner member 34. The seal 52 is axially positioned by ring 54 which abuts split retaining ring 56 seated in a complementary annular groove which is positioned in member 34. Ring 58 is seated in a complementary annular groove, in member 34, on the other side of seal 52 to restrict axial movement thereof. The second sealing means comprises an inner annular gland 56 having an inwardly opening recess 58 for receiving a third seal 60 which effectively establishes a fluid seal, between a portion of the outer surface of inner member 34 and inner gland 56. A bearing assembly 62 comprises an inner and outer spacer 64 and 66, respectively, for positioning raceways 68 and 70 which have opposed, inwardly facing grooves adapted to receive a plurality of complementary bearings 72 for transmitting axial loads while permitting relative rotation between inner and outer members 34 and 28. A split retaining ring 74 seated in a complementary groove on inner member 34 limits axial movement of inner gland 56 in one direction, while the bearing assembly 62 limits axial movement of inner gland 56 in the other direction. A fourth seal 76 is disposed concentrically about inner gland 56 for effecting a fluid seal between inner gland 56 and the inner surface of outer member 28. The seal 76 is restrained from axial movement by axially spaced rings 78 and 80 which are held in position by split retaining rings 82 and 84 seated in complementary grooves on inner surface 30 of member 28. A plurality of backup rings 86 may be utilized, as required, in conjunction with seals 46, 52, 60 and 76. Thus, it is readily apparent that the actuator mechanism 10 may be assembled without special tools, as substantially all connections are made by positively retained, split rings.

Figure 3:
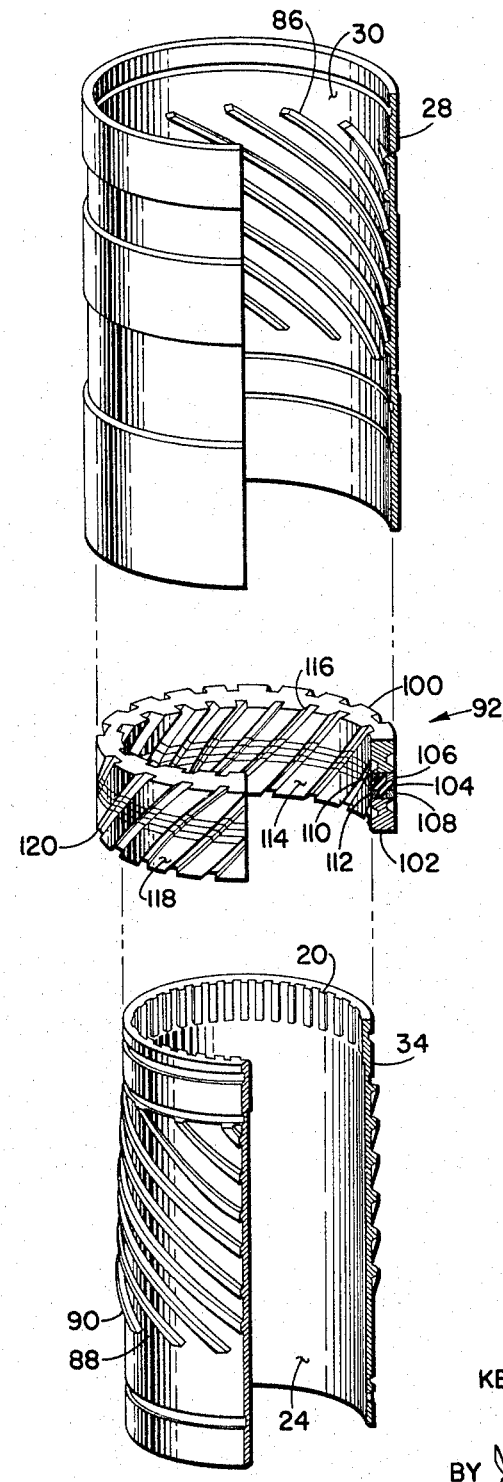
FIGURE 3 is an exploded, perspective view, partly in section, of certain members of the present actuator mechanism.

The outer member 28, as shown in detail FIG. 3, has a cylinder-like, inner wall or surface portion 30 which is provided with at least one right-hand, helical or oblique thread 86 fixedly secured thereto. Likewise, the inner member 34 has a cylinder-like, outer wall or surface portion 88 which is provided with at least one left-hand, helical or oblique thread 90 secured thereto. These threaded surface portions of inner and outer members 28 and 34 are arranged in a substantially spaced, parallel, opposed relationship for defining annular chamber 36 which is adapted to receive a floating annular piston 92. The floating piston 92 is constructed and arranged to reciprocate within the confines of chamber 36, in response to a pressure differential being established between opposite sides thereof by fluid pressure control means 94. The piston 92 is substantially free from the usual attachment or support. Thus, piston 92 is freely mounted and substantially buoyed in a fluid. The chamber 36 is effectively divided by piston 92 into a first and a second fluid working zone 96 and 98, as shown in FIG. 1, each of which communicate through fluid pressure control means 94 with a source of pressurized fluid (not shown). The piston 92, as shown in FIG. 3, has a plurality of axially spaced, substantially annular members 100 and 102, with a resilient fluid seal 104 positioned therebetween. The seal 104 may be formed from rubber, a desired elastomer material, or some other suitable material. Seal 104 has a cruciform configuration in a cross-section taken in a radial plane which contains the geometric axis of actuator 10. The seal 104 is retained in a substantially cruciform configuration by a plurality of retaining rings 106, 108, 110 and 112 positioned in a plurality of recesses located on the inner and outer peripheral edges of seal 104. The piston 92 has an inner peripheral surface 114 provided with at least one left-hand or oblique thread 116 fixed thereto and constructed and arranged to engage complementary thread 90 on inner member 34. The outer peripheral surface 118 of piston 92 is provided with at least one right-hand or oblique thread 120 secured thereto. However, the thread relationship may be reversed on all threaded members.

Figure 2:
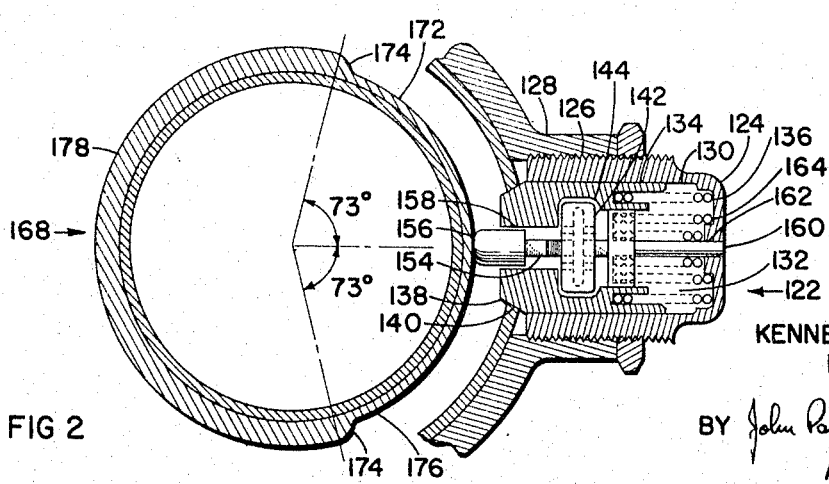
FIGURE 2 is a sectional view of the actuator release mechanism taken along line II—II of FIG. 1.

A releasable locking mechanism 122, as shown in FIG. 1, couples outer member 28 to fixed outer strut member 16. The releasable locking mechanism 122 includes an externally threaded, cylinder-like housing 124 adapted to threadedly engage an internally threaded bore 126 in boss 128 which is integral with strut member 16. The housing 124 has a side wall 130 defining a chamber 132 which is adapted to receive axially slidable cylinder-like, skirt member 134. Member 134 is biased by spring 136 outwardly from chamber 132 toward a locking position. The outer end portion of skirt member 134 is circumferentially beveled, as shown at 138, for engaging complementary circumferentially beveled opening 140 on outer member 28 for releasably locking members 16 and 28. A plurality of latching members 142 is guided by a plurality of diametrically positioned slots 144 for permitting reciprocal movement between an outwardly extending or locking position, as shown in FIG. 1, to a retracted or release position, wherein each outer beveled portion 146, of each latching member 142, is moved inwardly until each portion 146 is flush with the outer surface of skirt 134. In the locking position, each beveled end portion 146, of each latching member 142, engages complementary beveled surfaces within an opposed recess 148 inside wall 130. The latching members 142 are moved into a locking position by a plurality of pivotal toggle arms 150 so constructed and arranged to pivot about a pin 152 that is operatively connected to plunger or cam follower 154. Cam follower 154 has an enlarged end portion 156 slidably received in and extending through a complementary bore 158, in skirt member 134, and the opposite end 160 is slidably received in and extends through a complementary bore 162 in the housing 124. Plunger 154 is biased by spring 164 toward a locking position. Each toggle arm 150 is provided with a stop means 166 for holding the toggle arms 150 in a substantially vertical position. The enlarged end portion 156 is disposed in opposed relationship with circular cam 168, as illustrated in FIG. 2, which is fixedly secured to inner member 34 by suitable fastener means 170 (FIG. 1). The enlarged end portion 156, as illustrated in FIG. 2, engages and rides on the external peripheral surface 172 of cam 168 and is operable upon engagement with at least one cam step 174 to move plunger 154 outwardly for releasing outer member 28 from outer strut member 16, whereby member 28 may rotate relative thereto. Cam surface 172 is divided into at least two surface portions 176 and 178 which are connected by cam step 174. The surface 178 has a greater radius, taken from the geometric axis of actuator 10, than the radius of surface 176.

In operation, for piston 92 to rotate inner member 34, the fluid pressure control means or assembly 94, as shown in FIG. 1, will be connected with a conventional fluid reservoir (not shown) through a fluid supply conduit 180 and a fluid return conduit 182. Both of these conduits 180 and 182 are connected to a conventional electrically actuated control valve 184. The valve 184 has a housing 186 secured by conventional fasteners 188 to the outer strut members 16. Housing 186 has a plurality of spaced internal bores 190 and 192 adapted to receive movable sliders 194 and 196, respectively. Each of the valve sliders 194 and 196 have a plurality of longitudinally spaced lands for selectively establishing a desired pressure differential between the fluid working zones 96 and 98 for regulating the angular rotation of inner member 34. For example, if it is desired to rotate inner member 34 in either direction, fluid pressure is applied by conventional means through conduit 180 against the upper portion 198 of slider 196, thereby compressing spring 200 as slider 196 moves downwardly in bore (shown in broken lines in FIG. 1). Slider 194 may then be moved either upwardly or downwardly by conventional electromotive forces, to rotate inner member 34 in one or another angular direction. The upward movement of slider 194 establishes communication between pressurized fluid supply conduit 180 and the second working zone 98, through conduits 202, 204 and 206; however, fluid in the first working zone 96 is connected to the low-pressure fluid return 182 through conduits 208, 210 and 203. Likewise, downward movement of slider 194 permits communication between fluid supply conduit 180 and the first working zone 96, through conduits 202, 210 and 208, and communication is established between the second working zone 98 and the low-pressure fluid return through conduits 206 and 204.

In the event, it is desired to employ the fluid control means 94 as a damper, the valve sliders 194 and 196 are moved to the position shown in solid lines in FIG. 1. In this position the first and second working zones 96 and 98, respectively, are interconnected through by-pass conduit 212 which has an orifice or flow restriction 214 positioned therein for regulating fluid flow therethrough. Thus, any force tending to rotate inner member 34 will create a movement of piston 92 due to the interengaging threads 90 and 116, on inner member 34 and piston 92, respectively, and the interengaging threads 86 and 120 on outer member 28 and piston 92, respectively. As piston 92 tends to rotate and move in an axial direction the fluid volume and pressure within working zones 96 and 98 tend to vary in proportion to piston movement; however, flow of fluid through orifice 214 is reduced to such an extent as to oppose the axial movement of piston 92 to a predetermined coefficient. This in turn dampens and/or minimizes irregular movement and hunting by the actuator mechanism 10. This damper mode, of fluid control means 94, may be employed to minimize wobbling or abnormal vibration of a castor-type third wheel of a tricycle carriage.

The desired steering range of the present actuator mechanism 10 is between a range of zero degrees or a central, straight ahead position, through 73 degrees on either side thereof. Thus, the releasable locking mechanism 122 is provided for permitting the aircraft to maneuver outside the normal operating or steering range. Generally, the locking mechanism 122 releases only when the aircraft is towed in a turn exceeding 73 degrees and will re-engage upon completion of the turn. When locking mechanism 122 is moved to a release position the opposite end 160 projects outwardly from housing 124 to visually indicate said locking mechanism is disengaged. To re-engage locking mechanism 122, the piston 92 is moved in chamber 36 to its upper limit and then moved to its lower limit. This action will cause the actuator mechanism 10 to hunt fully through its entire operating range for re-engaging automatically when housing 124 is in alignment with opening 140 in the inner member 34 of actuator mechanism 10.

From the above description, it is readily apparent many additional advantages reside in the unique floating piston 92 which allows the actuator mechanism 10 to be lightweight and unusually compact. Such a compact actuator may be used with substantially any aircraft nose gear unit, as there is no increase in length beyond the normal strut. Also the annular envelope of the unit increases the overall outer diameter of the nose gear by only approximately two inches. Further, the compactness and concealed location of the actuator about an aircraft strut greatly reduces casual damage thereto. Moreover, employing the principle of opposed helical screws engaging a movable piston member effectively creates an actuating mechanism which provides equal torque in both directions throughout its entire operating range, and such an operating condition is usually very difficult to achieve when conventional external structural reactions are required to convert linear actuator motion to rotary motion. In addition, the actuator mechanism 10 may be assembled and disassembled without special tools, as substantially all connections are made by split retaining rings which are seated in complementary grooves.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. A reversible actuator mechanism for converting linear movement into rotary motion, said mechanism comprising:
   an inner, driven member and an outer member spaced from and disposed about said inner member for defining therebetween a chamber having ends;
   means for supporting the inner, driven member and the outer member in a substantially opposed, spaced relationship and including means for rotatably supporting the inner, driven member for rotation relative to said outer member;
   fluid sealing means disposed adjacent each end of said chamber for confining a fluid therein;
   a floating piston constructed and arranged for reciprocal movement within the confines of said chamber, said piston being disposed within said chamber and dividing said chamber into a first and a second fluid working zone;
   fluid pressure control means operatively connected to said first and second working zones for regulating the fluid pressure therebetween for effecting reciprocal movement of the piston means within the confines of said chamber;
   means operatively coacting with said piston for rotating the inner driven member in response to reciprocal movement of said piston;
   a support structure disposed adjacent the outer member; and
   means for releasably locking the outer member to said support structure, said means being responsive to rotation of the inner member a predetermined angular distance relative to the outer member for releasing said outer member from the support structure.

2. A reversible actuator mechanism for converting linear movement into rotary motion, said mechanism comprising:
   an inner, driven member and an outer member spaced from and disposed about said inner member for defining therebetween a chamber having ends;
   means for supporting the inner, driven member and the outer member in a substantially opposed, spaced relationship and including means for rotatably supporting the inner, driven member for rotation relative to said outer member;
   fluid sealing means disposed adjacent each end of said chamber for confining a fluid therein;
   a floating piston constructed and arranged for reciprocal movement within the confines of said chamber, said piston being disposed within said chamber and dividing said chamber into a first and a second fluid working zone,
   said floating piston comprising a plurality of spaced piston members, and a resilient sealing means disposed between said piston members for effecting a fluid seal between said first and second working zones;
   fluid pressure control means operatively connected to said first and second working zones for regulating the fluid pressure therebetween for effecting reciprocal movement of the piston means within the confines of said chamber; and
   means operatively coacting with said piston for rotating the inner driven member in response to reciprocal movement of said piston.

3. The reversible actuator mechanism recited in claim 2, said resilient sealing means having a substantially cruciform configuration in cross-section.

4. The reversible actuator mechanism recited in claim 2, further including:
   means for retaining said resilient sealing means in substantially cruciform configuration.

5. A reversible actuator mechanism for converting linear movement into rotary motion, said mechanism comprising:
   an inner member and an outer member spaced from and surrounding said inner member for defining therebetween a chamber having ends;
   means for supporting the members in a substantially opposed, spaced relationship, including means for rotatably supporting one of the members for rotation relative to the other member;

fluid sealing means disposed adjacent each end of said chamber for confining a fluid therein;

a floating piston constructed and arranged for reciprocal movement within the confines of said chamber, said piston being disposed within said chamber and dividing said chamber into a first and a second fluid working zone;

fluid pressure control means operatively connected to said first and second working zones for regulating the fluid pressure therebetween for effecting reciprocal movement of the piston means within the confines of said chamber;

means operatively coacting with said piston for rotating the rotatable member in response to reciprocal movement of said piston;

a support structure disposed adjacent the outer member; and means for releasably locking the outer member to said support structure, said means being responsive to rotation of the inner member a predetermined angular distance relative to the outer member for releasing said outer member from the support structure.

6. A reversible actuator mechanism for converting linear movement into rotary motion, said mechanism comprising:

an inner driven member and an outer member spaced from and disposed about said inner member for defining a chamber therebetween;

means for supporting the inner driven member and the outer member in a substantially opposed, spaced relationship, including means for rotatably supporting the inner driven member for rotation relative to said outer member;

a support structure disposed adjacent the outer member;

means for releasably locking the outer member to said support structure and responsive to rotation of the inner member a predetermined angular distance, in at least one direction, for releasing the outer member;

fluid sealing means disposed adjacent each end of said chamber for confining a fluid therein;

a floating piston constructed and arranged for reciprocal movement within the confines of said chamber, said piston being disposed within said chamber and dividing said chamber into a first and a second fluid working zone;

fluid pressure control means operatively connected to said first and second working zones for regulating the fluid pressure therebetween for effecting reciprocal movement of the piston within the confines of said chamber; and means operatively coacting with said piston for rotating the inner driven member in response to reciprocal movement of said piston.

7. The reversible actuator mechanism recited in claim 6, said means coacting with said piston for rotating said inner member comprising:

a first means coacting with said piston and said outer member in response to axial movement of the piston for rotating said piston; and a second means coacting with said piston and said inner member in response to rotary and axial movement of said piston for rotating said inner member.

8. The reversible actuator mechanism recited in claim 6 wherein the inner driven member is provided with an outer surface portion;

the outer member having an inner surface portion spaced from and surrounding the outer surface portion for defining said chamber;

the means coacting with said piston for rotating the inner member in response to reciprocal movement of said piston including the outer surface portion and the inner surface portion, said outer and inner surface portions each having at least one obliquely disposed thread fixedly secured thereto, with one of said surface portions having at least one right-hand thread while the other surface portion is provided with at least one left-hand thread fixedly secured thereto; and the piston having an inner and outer peripheral surface with the inner peripheral surface having complementary, oblique threads constructed and arranged for threaded engagement with the threads on the outer surface portion, said outer peripheral surface having complementary, oblique threads constructed and arranged for threaded engagement with the threads on the inner surface portion.

References Cited
UNITED STATES PATENTS

| | | | |
|---|---|---|---|
| 978,586 | 12/1910 | Hultquist | 92—32 X |
| 3,133,476 | 5/1964 | Geyer | 92—31 |
| 3,141,387 | 7/1964 | Geyer | 92—33 |
| 3,319,925 | 5/1967 | Koichi Kojima et al. | 92—31 X |
| 3,329,069 | 7/1967 | Feroy | 92—33 |
| 3,339,463 | 9/1967 | Updegrave | 92—31 |

CARROLL B. DORITY, JR., Primary Examiner.

U.S. Cl. X.R.

74—89.14